United States Patent
Funada (10) Patent No.: US 12,469,619 B2
(45) Date of Patent: Nov. 11, 2025

(54) RECTANGULAR CROSS-SECTION MULTI-CORE INSULATED WIRE, AND METHOD FOR MANUFACTURING SAME

(71) Applicant: TOTOKU MAKISEN CO., LTD., Ueda (JP)

(72) Inventor: Kazutaka Funada, Ueda (JP)

(73) Assignee: TOTOKU MAKISEN CO., LTD., Ueda (JP)

(*) Notice: Subject to any disclaimer, the term of this patent is extended or adjusted under 35 U.S.C. 154(b) by 80 days.

(21) Appl. No.: 18/282,632

(22) PCT Filed: Jun. 13, 2022

(86) PCT No.: PCT/JP2022/023588
§ 371 (c)(1),
(2) Date: Sep. 18, 2023

(87) PCT Pub. No.: WO2023/276629
PCT Pub. Date: Jan. 5, 2023

(65) Prior Publication Data
US 2024/0186033 A1    Jun. 6, 2024

(30) Foreign Application Priority Data

Jun. 29, 2021  (JP) .................................. 2021-107425
Feb. 25, 2022  (JP) .................................. 2022-028115

(51) Int. Cl.
H01B 7/02    (2006.01)
H01B 1/02    (2006.01)
(Continued)

(52) U.S. Cl.
CPC .............. *H01B 7/02* (2013.01); *H01B 1/026* (2013.01); *H01B 3/302* (2013.01); *H01B 13/02* (2013.01); *H01B 13/06* (2013.01)

(58) Field of Classification Search
CPC . H01B 3/48; H01B 5/08; H01B 7/009; H01B 7/02; H01B 7/04; H01B 7/18;
(Continued)

(56) References Cited

U.S. PATENT DOCUMENTS

| 587,764 | A | * | 8/1897 | Short | H01B 7/285 |
| | | | | | 174/110 R |
| 1,697,134 | A | * | 1/1929 | Neely | H02K 3/34 |
| | | | | | 427/430.1 |

(Continued)

FOREIGN PATENT DOCUMENTS

| JP | S51-32236 B1 | 9/1976 |
| JP | S59-96605 A  | 6/1984 |

(Continued)

OTHER PUBLICATIONS

PCT/ISA/210, "International Search Report for PCT International Application No. PCT/JP2022/023588," Aug. 23, 2022.
(Continued)

*Primary Examiner* — William H. Mayo, III
(74) *Attorney, Agent, or Firm* — HAUPTMAN HAM, LLP (57) ABSTRACT

A rectangular cross-section multi-core insulated wire includes an assembly of wires in which insulating layers are formed on peripheries of conductors, and the assembly of the wires is a composite twisted structure, and includes first twisted wires formed by twisting the wires, second twisted wires formed by twisting the first twisted wires, and third twisted wires formed by twisting the second twisted wires. An insulating fiber thread is wound around a periphery, a cross-section is formed in a rectangular shape, and a winding direction of the fiber thread is a direction opposite to a twisting direction of outermost twisted wires in the assembly of the wires.

3 Claims, 6 Drawing Sheets

(51) Int. Cl.
  *H01B 3/30* (2006.01)
  *H01B 13/02* (2006.01)
  *H01B 13/06* (2006.01)

(58) Field of Classification Search
  CPC ...... H01B 7/1875; H01B 7/30; H01B 11/002;
         H01B 11/20; H02K 3/14; H02K 15/014;
                                      H02K 15/04
  USPC .... 174/34, 36, 110 R–110 N, 117 R–117 FF,
         174/128.1, 128.2, 129 R, 133 R,
         174/DIG. 19–DIG. 22; 310/156.32,
         310/156.36, 156.34, 156.35, 180, 184,
         310/201, 207–208, 213, 268; 336/205,
                                 336/206, 209, 216
  See application file for complete search history.

(56) References Cited

U.S. PATENT DOCUMENTS

| | | | | |
|---|---|---|---|---|
| 1,727,971 | A * | 9/1929 | Stearns | H01B 11/00 |
| | | | | 57/210 |
| 2,978,530 | A * | 4/1961 | Braeckman | H01B 13/02 |
| | | | | 174/128.1 |
| 3,509,269 | A * | 4/1970 | Elliott | H01B 7/28 |
| | | | | 162/138 |
| 3,681,510 | A * | 8/1972 | Lemieux | H01B 7/285 |
| | | | | 174/110 SY |
| 3,772,454 | A * | 11/1973 | Donecker | H01B 7/226 |
| | | | | 174/128.1 |
| 3,866,316 | A * | 2/1975 | Takechi | H02K 15/12 |
| | | | | 174/120 SR |
| 4,431,860 | A * | 2/1984 | Perco | H01B 7/306 |
| | | | | 174/113 A |
| 5,140,292 | A * | 8/1992 | Aronow | H01F 27/323 |
| | | | | 29/605 |
| 6,069,430 | A * | 5/2000 | Tsunoda | H02K 3/40 |
| | | | | 174/120 SR |
| 6,649,844 | B2 * | 11/2003 | Kusumoto | H02K 3/12 |
| | | | | 174/128.1 |
| 7,863,795 | B2 * | 1/2011 | Joho | H02K 15/0414 |
| | | | | 174/128.1 |
| 8,823,238 | B2 * | 9/2014 | Greaves | H02K 15/0433 |
| | | | | 310/268 |
| 10,128,728 | B2 * | 11/2018 | Hirao | H02K 3/14 |
| 2019/0172606 | A1 * | 6/2019 | Kohori | H01B 7/1875 |

FOREIGN PATENT DOCUMENTS

| | | |
|---|---|---|
| JP | S61-142608 A | 6/1986 |
| JP | S63-006815 Y2 | 2/1988 |
| JP | H10-321358 A | 12/1998 |
| JP | 2009-245658 A | 10/2009 |
| JP | 2017157703 A | 9/2017 |
| JP | 2019-053997 A | 4/2019 |
| JP | 2019-204837 A | 11/2019 |

OTHER PUBLICATIONS

Extended European Search Report of European Application No. 22832786.2 dated Aug. 19, 2024, 8 pp.

* cited by examiner

RECTANGULAR CROSS-SECTION MULTI-CORE INSULATED WIRE, AND METHOD FOR MANUFACTURING SAME

RELATED APPLICATIONS

The present application is National Phase of International Application No. PCT/JP2022/023588 filed Jun. 13, 2022, and claim priority from Japanese Applications No. 2021-107425, filed Jun. 29, 2021 and No. 2022-028115, filed Feb. 25, 2022, the disclosures of which are hereby incorporated by reference herein in its entirety.

TECHNICAL FIELD

The present invention relates to a rectangular cross-section multi-core insulated wire and a method for manufacturing the same.

BACKGROUND ART

Conventionally, a configuration has been proposed in which an assembly of wires is formed into a quadrangle through compression forming and provided with an insulating layer (PTL 1: JP-A-S59-096605). Also, a configuration has been proposed in which a litz wire is formed into a rectangular shape through compression forming, a glass-fiber thread is wound around the periphery, and the wires are bound together with a synthetic resin (PTL 2: JP-Y-S63-006815). Furthermore, a method has been proposed that twists multiple wires together, forms the wires into a rectangular shape through wire drawing, and forms an insulating layer through extrusion covering (PTL 3: JP-A-2009-245658).

CITATION LIST

Patent Literature

PTL 1: JP-A-S59-096605
PTL 2: JP-Y-S63-006815
PTL 3: JP-A-2009-245658

SUMMARY OF INVENTION

Technical Problem

When an insulated wire is applied to a coil of a noncontact charger for an electric device, an electric motor, or an automobile, for example, flexibility (pliancy) is required that allows it to conform when bent into a desired shape. However, with conventional art, the extruded insulating layer and interposed binding resin increase the overall hardness, and it is therefore difficult to bend it into a desired shape. On the other hand, an assembly of a large number of wires tends to fray, and it is therefore difficult to maintain its shape unless a binding resin or the like is used.

Solution to Problem

The invention is made in view of the foregoing circumstances, and it is an object of the invention to provide a rectangular cross-section multi-core insulated wire having a configuration that has excellent insulation performance, is applicable to a coil of a noncontact charger, and has both flexibility and shape stability.

The invention has been accomplished under the solutions as disclosed below.

A rectangular cross-section multi-core insulated wire according to the invention includes an assembly of wires in which insulating layers are formed on peripheries of conductors, the assembly of the wires is a composite twisted structure including first twisted wires formed by twisting the wires, second twisted wires formed by twisting the first twisted wires, and third twisted wires formed by twisting the second twisted wires, an insulating fiber thread is wound around a periphery, a cross-section is formed in a rectangular shape, and a winding direction of the fiber thread is a direction opposite to a twisting direction of outermost twisted wires in the assembly of the wires.

According to this configuration, the composite twisted structure including the first twisted wires, the second twisted wires, and the third twisted wires can provide flexibility (pliancy) that allows it to conform to bending. Also, since the winding direction of the fiber thread is opposite to the twisting direction of the outermost twisted wires in the assembly of the wires, the fiber thread can provide a covering without entering between the wires. Furthermore, the fiber thread receives an external force during formation into a rectangular shape to protect the internal assembly of the wires, and fraying of the assembly of the wires can be prevented.

In one example, the number of first wires forming each first twisted wire of the number of wires is greater than or equal to the number of second wires forming each second twisted wire of the number of wires, and the number of second wires forming each second twisted wire of the number of wires is greater than or equal to the number of third wires forming each third twisted wire of the number of wires. According to this configuration, higher flexibility (pliancy) can be obtained. In one example, the number of first wires forming each first twisted wire of the number of wires is greater than the number of second wires forming each second twisted wire of the number of the wires, and the number of second wires forming each second twisted wire of the number of the wires is greater than the number of third wires forming each third twisted wire of the number of wires. In one example, the twist pitch is configured such that the first pitch of the first twisted wire is less than the second pitch of the second twisted wire and the second pitch of the second twisted wire is less than the third pitch of the third twisted wire. This configuration resists fraying, so that the rectangular shape of the assembly can be easily maintained.

In one example, the conductor is made of copper or a copper alloy, and the insulating layer is made of polyurethane. This allows the configuration to have high conductivity and excellent solderability. In one example, the fiber thread is made of polyester. This facilitates the spreading of insulating resin when it is applied to a coil and impregnated with the insulating resin, achieving high adhesiveness. In one example, the number of wires is greater than or equal to 2000. This achieves higher flexibility and allows the configuration to have excellent current-carrying characteristics in a high frequency band. In one example, the number of wires is less than or equal to 4000. This increases the space factor of the conductors, while ensuring the necessary bending strength when applied to a coil.

In one example, the assembly of the wires is a composite twisted structure including the first twisted wires, the second twisted wires, the third twisted wires, and a fourth twisted wire, and a twisting direction of each of the first twisted wires, the second twisted wires, the third twisted wires, and the fourth twisted wire is a first direction, and a winding direction of the fiber thread is a direction opposite to the first direction. In one example, the rectangular cross-section multi-core insulated wire includes an assembly of wires in which insulating layers are formed on peripheries of conductors, the assembly is a composite twisted structure including first twisted wires formed by twisting the wires, second twisted wires formed by twisting the first twisted wires, third twisted wires formed by twisting the second twisted wires, and a fourth twisted wire formed by twisting the third twisted wires, an insulating fiber thread is wound around a periphery, a cross-section is formed in a rectangular shape, and a twisting direction of each of the first twisted wires, the second twisted wires, the third twisted wires, and the fourth twisted wire is a first direction, and a winding direction of the fiber thread is a direction opposite to the first direction. This configuration provides higher flexibility.

In one example, the assembly of the wires is a composite twisted structure including the first twisted wires, the second twisted wires, the third twisted wires, and a fourth twisted wire, a twisting direction of each of the first twisted wires, the second twisted wires, and the third twisted wires is a second direction, a twisting direction of the fourth twisted wire is a direction opposite to the second direction, and a winding direction of the fiber thread is the second direction. In one example, the rectangular cross-section multi-core insulated wire includes an assembly of wires in which insulating layers are formed on peripheries of conductors, the assembly is a composite twisted structure including first twisted wires formed by twisting the wires, second twisted wires formed by twisting the first twisted wires, third twisted wires formed by twisting the second twisted wires, and a fourth twisted wire formed by twisting the third twisted wires, an insulating fiber thread is wound around a periphery, a cross-section is formed in a rectangular shape, a twisting direction of each of the first twisted wires, the second twisted wires, and the third twisted wires is a second direction, a twisting direction of the fourth twisted wire is a direction opposite to the second direction, and a winding direction of the fiber thread is the second direction. This configuration provides higher shape stability.

A method for manufacturing a rectangular cross-section multi-core insulated wire according to the invention includes: using wires in which insulating layers are formed on peripheries of conductors, forming an assembly of the wires of a composite twisted structure including first twisted wires formed by twisting the wires, second twisted wires formed by twisting the first twisted wires, and third twisted wires formed by twisting the second twisted wires; winding an insulating fiber thread on a periphery of the assembly of the wires in a direction opposite to a twisting direction of outermost twisted wires in the assembly of the wires; and subsequently forming a cross-section into a rectangular shape. The method for manufacturing a rectangular cross-section multi-core insulated wire includes: forming an assembly of the wires of a composite twisted structure by forming first twisted wires by twisting wires each including an insulating layer on a periphery of a conductor in a first direction, by forming second twisted wires by twisting the first twisted wires in the first direction, by forming third twisted wires by twisting the second twisted wires in the first direction, and by forming a fourth twisted wire by twisting the third twisted wires in the first direction; winding an insulating fiber thread on a periphery of the assembly in an opposite direction to the first direction; and subsequently forming a cross-section into a rectangular shape.

According to this configuration, it is possible to obtain flexibility (pliancy) that allows it to conform to bending when applied to a coil, for example. Also, the fiber thread can provide a covering without entering between the wires. Furthermore, it is possible to protect the internal assembly of the wires from an external force during formation into a rectangular shape, and to prevent the assembly of the wires from fraying.

Advantageous Effects of Invention

According to the invention, it is possible to achieve a rectangular cross-section multi-core insulated wire having a configuration that has excellent insulation performance, is applicable to a coil of a noncontact charger, and has both flexibility and shape stability.

DESCRIPTION OF EMBODIMENTS

Referring to the drawings, an embodiment of the invention is now described in detail. In one example, a rectangular cross-section multi-core insulated wire 1 of the present embodiment is applied to a coil in a noncontact charger such as an electric device, an electric motor, or an automobile. Throughout the figures illustrating embodiments, members having the same functions are denoted by the same reference numerals, and repeated description thereof may be omitted.

Figure 1:
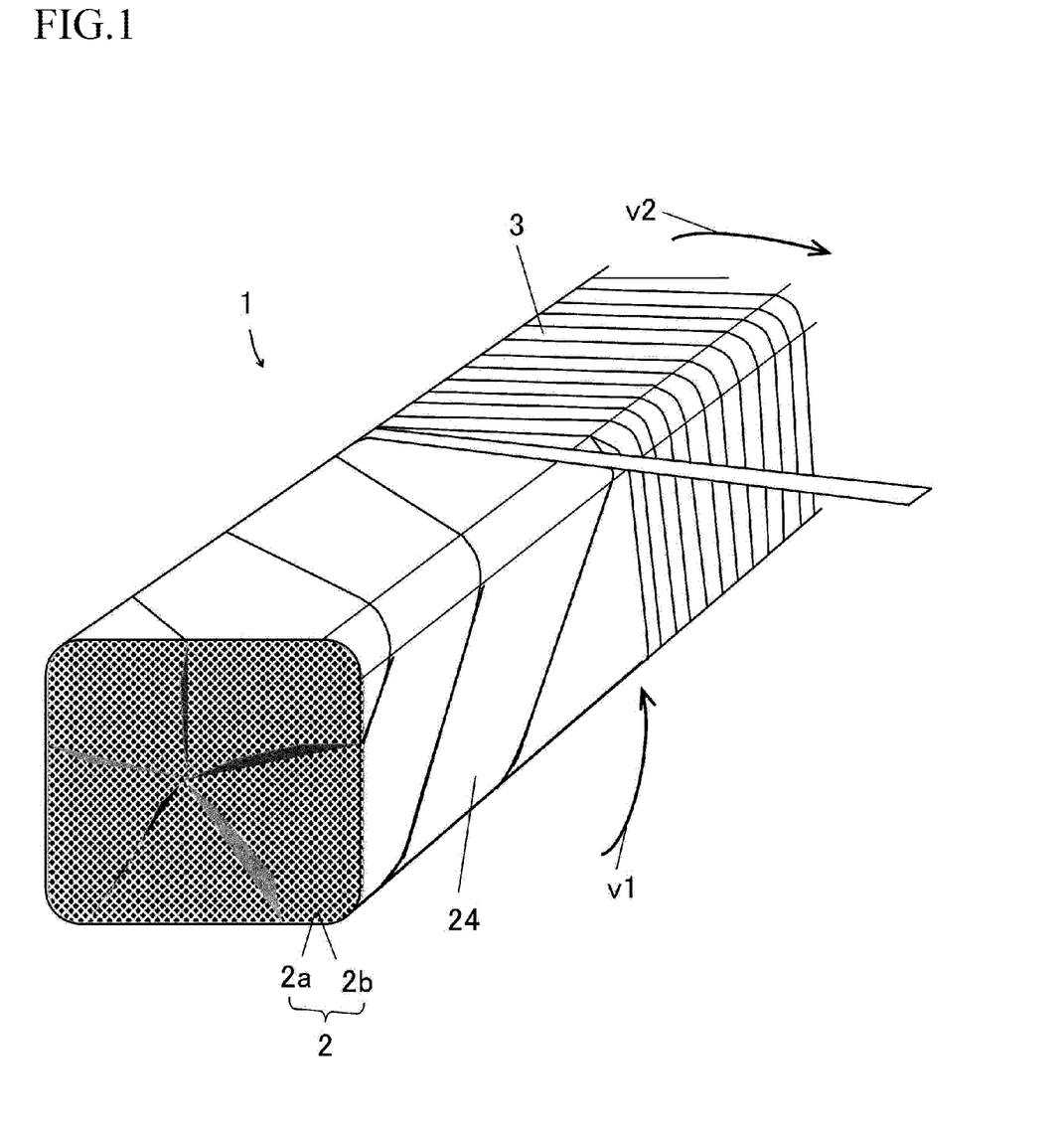
FIG. 1 is a structural diagram schematically showing the structure of a rectangular cross-section multi-core insulated wire according to an embodiment of the invention.

As shown in FIG. 1, the rectangular cross-section multi-core insulated wire 1 includes an assembly of wires 2, in which insulating layers 2b are formed on the peripheries of conductors 2a, and is a composite twisted structure including first twisted wires 21, second twisted wires 22, third twisted wires 23, and a fourth twisted wire 24, an insulating fiber thread 3 is wound around the periphery, the cross-section is formed into a rectangular shape, and a winding direction of the fiber thread 3 is a direction opposite to a twisting direction of the outermost twisted wires in the assembly of the wires 2.

The conductor 2a forming each wire 2 is a solderable conductor with electrical conductivity and is made of copper or a copper alloy, for example. The insulating layer 2b is an insulating film that has excellent insulating properties and does not interfere with soldering, and is made of polyurethane or polyester, for example. An enameled wire can be used as the wire 2. The insulating fiber thread 3 is a covering thread and is selected from polyester thread, acrylic thread, polypropylene thread, and polyurethane thread, for example. The material of the fiber thread 3 can be appropriately set according to the application.

In the rectangular cross-section multi-core insulated wire 1, the assembly of the wires 2 is covered with the fiber thread 3 to be protected and insulated from the outside. As shown in FIG. 1, the assembly of the wires 2 is shaped so as to have a rectangular cross-section. In the example of FIG. 1, the twisting direction of the fourth twisted wire 24 is a first direction v1, and the winding direction of the fiber thread 3 is a second direction v2 opposite to the twisting direction. The first direction v1 and the second direction v2 as used herein indicate a relative relationship, and there may be a case in which the twisting direction of the fourth twisted wire 24 is the second direction v2 and the winding direction of the fiber thread 3 is the second direction v2 opposite to the twisting direction. For example, the twisting direction is right-hand twisting or S-twisting, and the winding direction of the fiber thread 3 is left-hand winding. Also, for example, the twisting direction is left-hand twisting or Z-twisting, and the winding direction of the fiber thread 3 is right-hand winding. In one example, an apparatus for manufacturing the rectangular cross-section multi-core insulated wire 1 includes a twisting apparatus, a forming apparatus, and a winding apparatus, which are arranged in this order from the upstream side.

Next, the first example of the rectangular cross-section multi-core insulated wire 1 and its manufacturing procedure are described below.

First Example

Figure 2A:
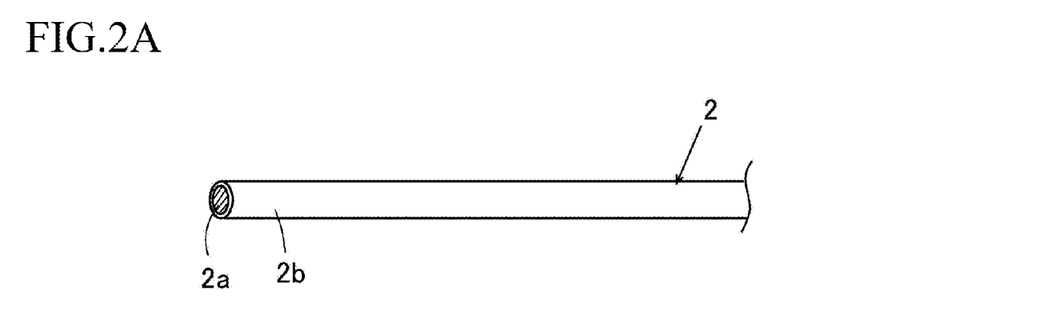
FIG. 2A is a diagram schematically showing a wire in an example of the rectangular cross-section multi-core insulated wire shown in FIG. 1.
Figure 2B:
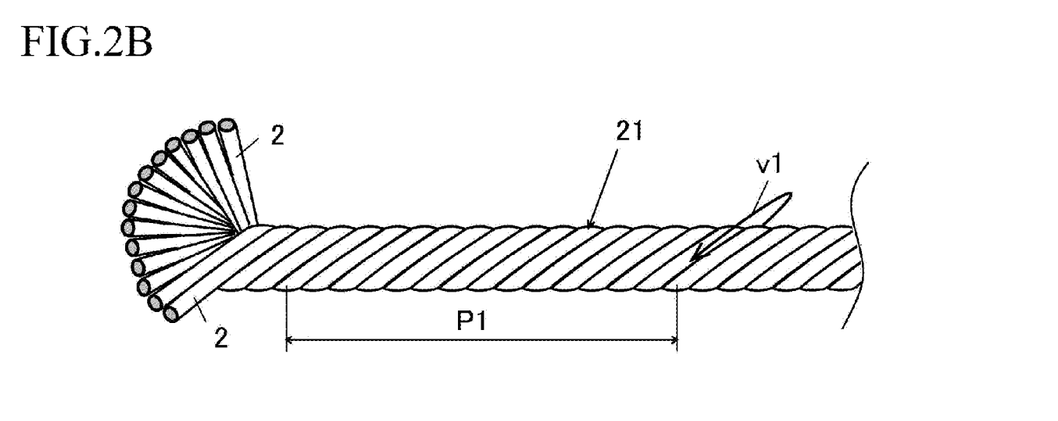
FIG. 2B is a diagram showing a state in which wires of FIG. 2A are twisted to form a first twisted wire.
Figure 2C:
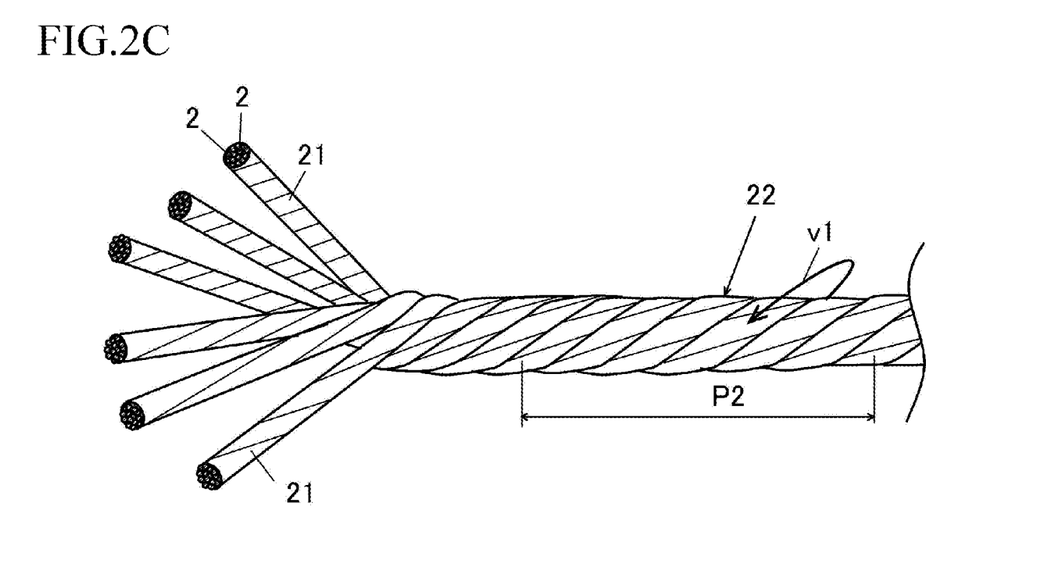
FIG. 2C is a diagram showing a state in which first twisted wires of FIG. 2B are twisted to form a second twisted wire.
Figure 3A:
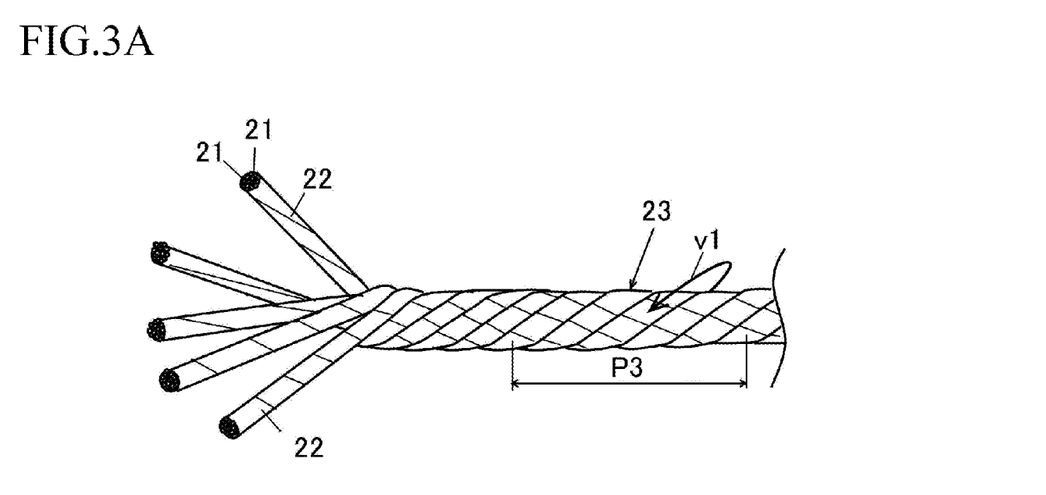
FIG. 3A is a diagram showing a state in which second twisted wires of FIG. 2C are twisted to form a third twisted wire.
Figure 3B:
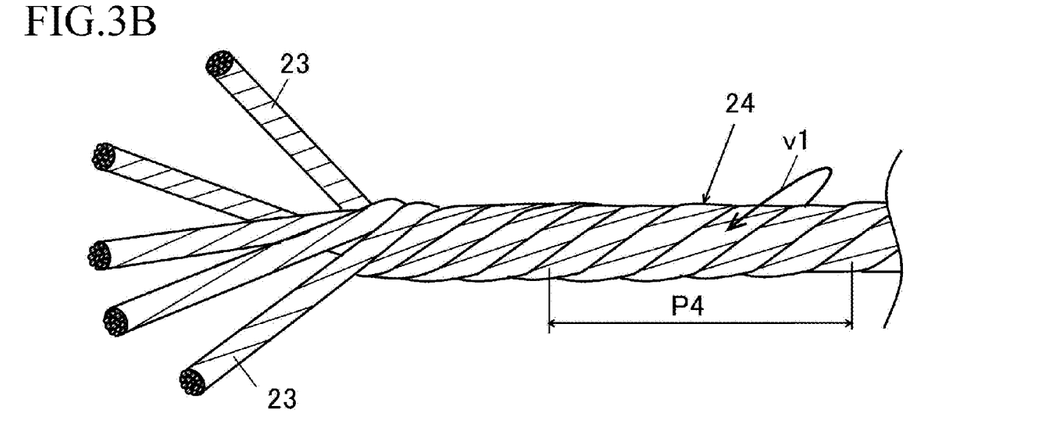
FIG. 3B is a diagram showing a state in which third twisted wires of FIG. 3A are twisted to form a fourth twisted wire.
Figure 3C:
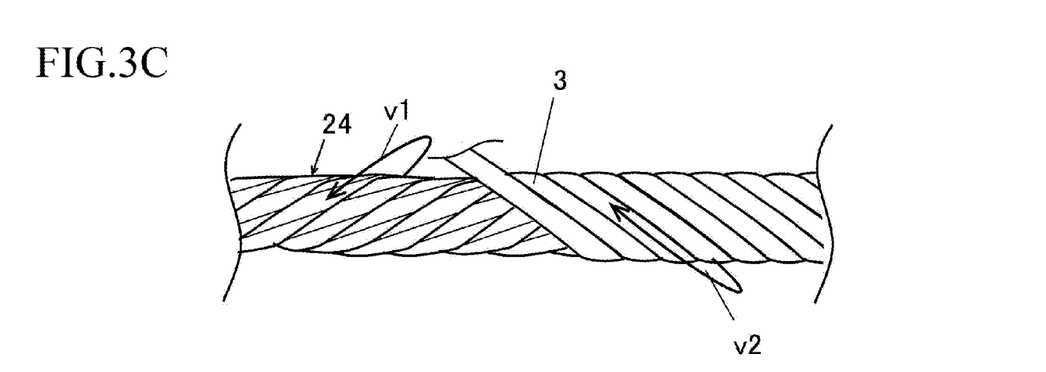
FIG. 3C is a diagram showing a state in which the fourth twisted wire of FIG. 3B is covered with a fiber thread.

As shown in FIG. 2A, wires 2 each including a conductor 2a, which is made of copper or a copper alloy, and an insulating layer 2b, which is made of polyurethane or polyester, are used. Then, as shown in FIG. 2B, 7 or more and 21 or less wires 2 are twisted in a first direction v1 to form a first twisted wire 21. The length in the longitudinal direction of one turn of the first wire in the wires 2 is a first pitch P1. Then, as shown in FIG. 2C, three or more and nine or less first twisted wires 21 are twisted in the first direction v1 to form a second twisted wire 22. The length in the longitudinal direction of one turn of the first wire in the first twisted wires 21 is a second pitch P2. As shown in FIG. 3A, three or more and seven or less second twisted wires 22 are then twisted in the first direction v1 to form a third twisted wire 23. The length in the longitudinal direction of one turn of the first wire in the second twisted wires 22 is a third pitch P3. As shown in FIG. 3B, three or more and seven or less third twisted wires 23 are then twisted in the first direction v1 to form a fourth twisted wire 24. The length in the longitudinal direction of one turn of the first wire in the fourth twisted wire 24 is a fourth pitch P4. Then, as shown in FIG. 3C, an insulating fiber thread 3 is wound around the periphery of the fourth twisted wire 24 in a second direction v2 opposite to the first direction v1. Subsequently, it is sandwiched between rollers of the forming apparatus to form its cross-section into a rectangular shape so that a rectangular cross-section multi-core insulated wire 1 is provided. Then, the formed rectangular cross-section multi-core insulated wire 1 is wound on a drum.

Next, the second example of a rectangular cross-section multi-core insulated wire 1 and its manufacturing procedure are described below.

Second Example

Figure 4A:
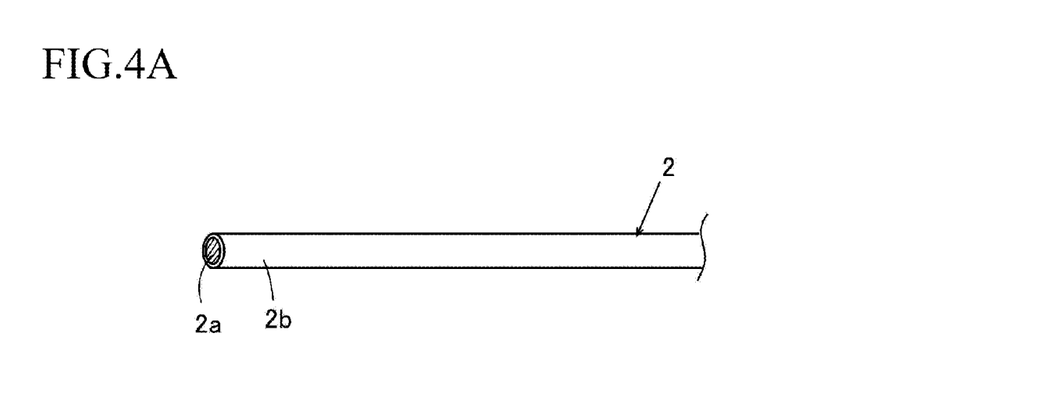
FIG. 4A is a diagram schematically showing a wire in another example of the rectangular cross-section multi-core insulated wire shown in FIG. 1.
Figure 4B:
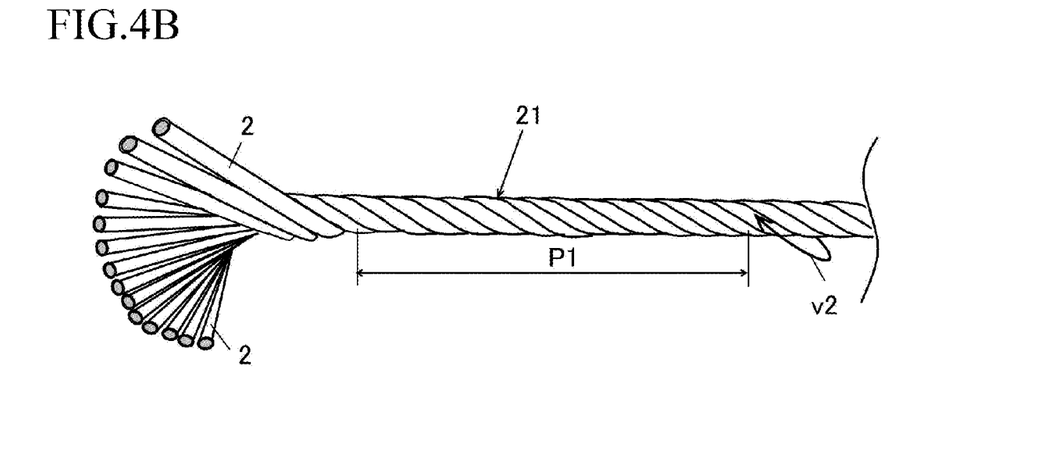
FIG. 4B is a diagram showing a state in which wires of FIG. 4A are twisted to form a first twisted wire.
Figure 4C:
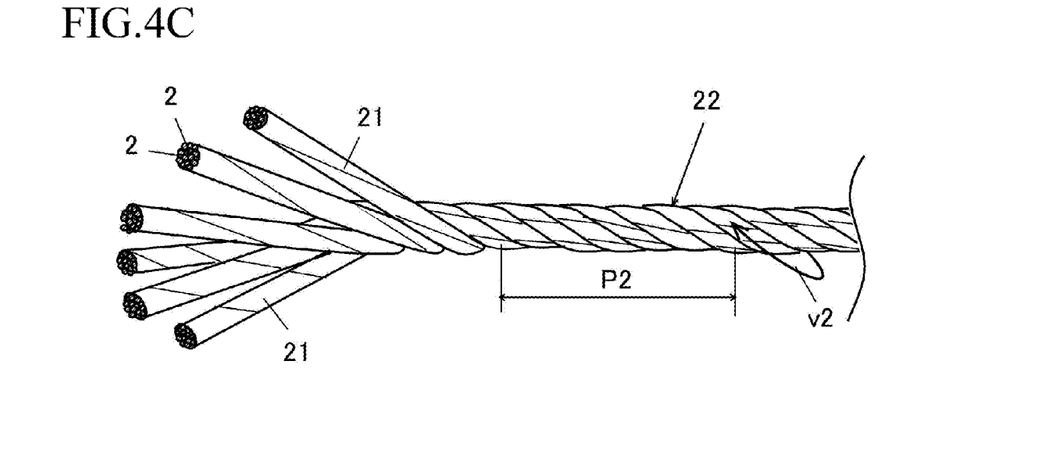
FIG. 4C is a diagram showing a state in which first twisted wires of FIG. 4B are twisted to form a second twisted wire.
Figure 5A:
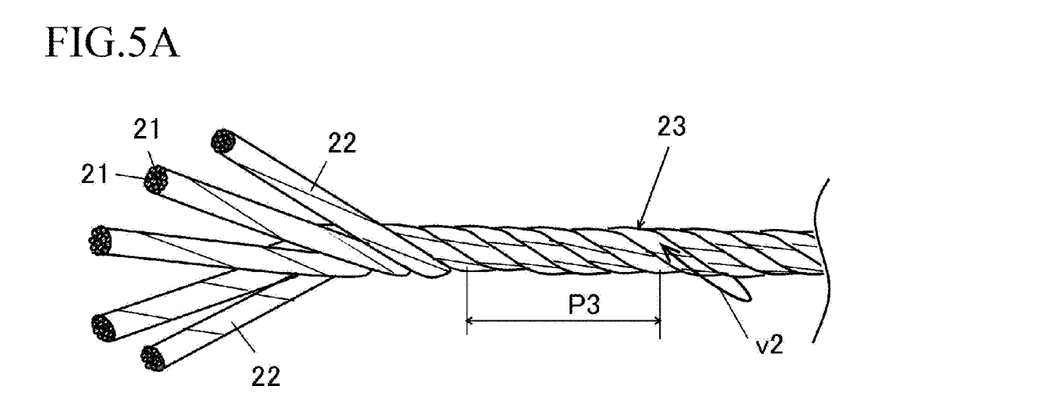
FIG. 5A is a diagram showing a state in which second twisted wires of FIG. 4C are twisted to form a third twisted wire.
Figure 5B:
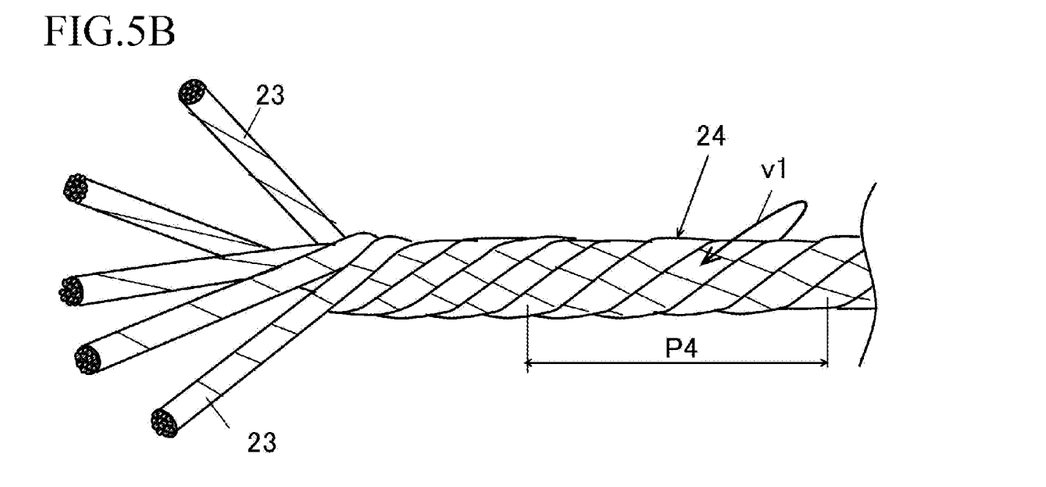
FIG. 5B is a diagram showing a state in which third twisted wires of FIG. 5A are twisted to form a fourth twisted wire.
Figure 5C:
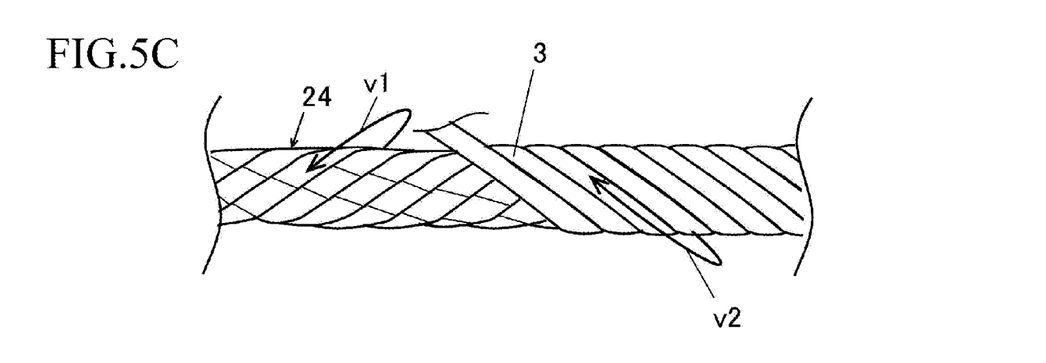
FIG. 5C is a diagram showing a state in which the fourth twisted wire of FIG. 5B is covered with a fiber thread.

As shown in FIG. 4A, wires 2 each including a conductor 2a, which is made of copper or a copper alloy, and an insulating layer 2b, which is made of polyurethane or polyester, are used. Then, as shown in FIG. 4B, 7 or more and 21 or less wires 2 are twisted in the second direction v2 to form a first twisted wire 21. As shown in FIG. 4C, three or more and nine or less first twisted wires 21 are then twisted in a second direction v2 to form a second twisted wire 22. As shown in FIG. 5A, three or more and seven or less second twisted wires 22 are then twisted in the second direction v2 to form a third twisted wire 23. As shown in FIG. 5B, three or more and seven or less third twisted wires 23 are then twisted in a first direction v1 to form a fourth twisted wire 24. Then, as shown in FIG. 5C, an insulating fiber thread 3 is wound around the periphery of the fourth twisted wire 24 in the second direction v2 opposite to the first direction v1. Subsequently, it is sandwiched between rollers of the forming apparatus to form its cross-section into a rectangular shape so that a rectangular cross-section multi-core insulated wire 1 is provided. Then, the formed rectangular cross-section multi-core insulated wire 1 is wound on a drum.

The first example above is of same-direction twisting, and the second example is of rope twisting. In the first and second examples, the twisting direction of the fourth twisted wire 24 is the first direction v1, and the winding direction of the fiber thread 3 is the second direction v2. The first direction v1 and the second direction v2 as used herein indicate a relative relationship, and there may be a case in which the twisting direction of the fourth twisted wire 24 is the second direction v2 and the winding direction of the fiber thread 3 is the second direction v2 opposite to the twisting direction.

Table 1 below shows examples of the rectangular cross-section multi-core insulated wire 1.

TABLE 1

| | | Same-direction twisting | | Rope twisting | |
| --- | --- | --- | --- | --- | --- |
| | | First example | Third example | Second example | Fourth example |
| First process | | S-twisting (Right-hand twisting) | Z-twisting (Left-hand twisting) | Z-twisting (Left-hand twisting) | S-twisting (Right-hand twisting) |
| Second process | | S-twisting (Right-hand twisting) | Z-twisting (Left-hand twisting) | Z-twisting (Left-hand twisting) | S-twisting (Right-hand twisting) |

TABLE 1-continued

|  | Same-direction twisting | | Rope twisting | |
| --- | --- | --- | --- | --- |
|  | First example | Third example | Second example | Fourth example |
| Third process | S-twisting (Right-hand twisting) | Z-twisting (Left-hand twisting) | Z-twisting (Left-hand twisting) | S-twisting (Right-hand twisting) |
| Fourth process | S-twisting (Right-hand twisting) | Z-twisting (Left-hand twisting) | S-twisting (Right-hand twisting) | Z-twisting (Left-hand twisting) |
| Winding process | Z-winding (Left-hand winding) | S-winding (Right-hand winding) | Z-winding (Left-hand winding) | S-winding (Right-hand winding) |
| Forming process | Rectangular shape into cross-section forming (Square in cross section, or Rectangular in cross section) | | | |

Next, an example of the rectangular cross-section multi-core insulated wire 1 according to the present embodiment is described below.

The method for manufacturing the rectangular cross-section multi-core insulated wire 1 is as described above. Each wire 2 includes a conductor 2a and an insulating layer 2b. The conductor 2a is made of copper wire or copper alloy wire with a diameter of 0.1 mm. The insulating layer 2b is made of polyurethane or polyester with a thickness of 9 µm on one side in the radial direction. A fiber thread 3 includes six polyester yarns of 110 dtex. Fourteen wires 2 are twisted in the first direction v1 at a first pitch P1 of 25 mm to form a first twisted wire 21. Then, six first twisted wires 21 are twisted in the first direction v1 at a second pitch of 45 mm to form a second twisted wire 22. Five second twisted wires 22 are then twisted in the first direction v1 at a third pitch of 85 mm to form a third twisted wire 23. Five third twisted wires 23 are twisted in the first direction v1 at a fourth pitch of 115 mm to form a fourth twisted wire 24. The fiber thread 3 is then wound around the periphery of the fourth twisted wire 24 in the second direction v2. Subsequently, it is sandwiched between rollers of the forming apparatus to form its cross-section into a rectangular shape so that a rectangular cross-section multi-core insulated wire 1 is provided.

The rollers are provided in multiple stages.

Figure 6:
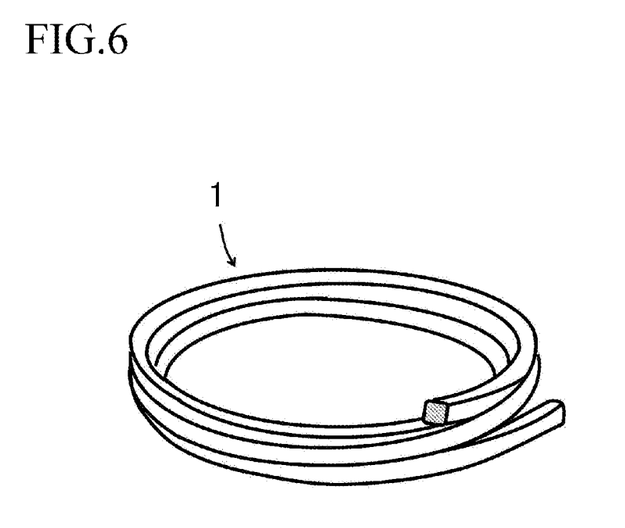
FIG. 6 is a diagram showing a state in which the rectangular cross-section multi-core insulated wire shown in FIG. 1 is coiled.

In one example, as shown in FIG. 6, the rectangular cross-section multi-core insulated wire 1 is bent into a coil shape to be used. If necessary, it is cut to a desired length and subjected to terminal processing such as soldering, fusing treatment, or terminal attachment. According to the present embodiment described above, it is possible to provide a configuration that has both flexibility (pliancy) that can conform to bending, and shape stability. Also, the fiber thread can provide a covering without entering between the wires. Furthermore, it is possible to protect the internal assembly of the wires from an external force during formation into a rectangular shape and to prevent the assembly of the wires from fraying.

The invention is not limited to the embodiments described above, and various modifications can be made without departing from the scope of the invention.

What is claimed is:

1. A rectangular cross-section multi-core insulated wire comprising:
    an assembly of wires in which insulating layers are formed on peripheries of conductors, wherein
    the assembly of the wires is a composite twisted structure consisting of first twisted wires formed by twisting the wires, second twisted wires formed by twisting the first twisted wires, third twisted wires formed by twisting the second twisted wires, and fourth twisted wires formed by twisting the third twisted wires,
    an insulating fiber thread is wound around a periphery,
    a cross-section is formed in a rectangular shape,
    a winding direction of the fiber thread is a direction opposite to a first direction,
    a twisting direction of each of the first twisted wires, the second twisted wires, and the third twisted wires is in the second direction, and
    a twisting direction of the fourth twisted wire is the first direction.

2. The rectangular cross-section multi-core insulated wire according to claim 1, wherein
    the conductors are made of copper or a copper alloy,
    the insulating layer is made of polyurethane,
    the fiber thread is made of polyester, and
    the number of wires is greater than or equal to 2000.

3. A method for manufacturing a rectangular cross-section multi-core insulated wire, the method comprising:
    using wires in which insulating layers are formed on peripheries of conductors, forming an assembly of the wires of a composite twisted structure consisting of first twisted wires formed by twisting the wires, second twisted wires formed by twisting the first twisted wires, third twisted wires formed by twisting the second twisted wires, and fourth twisted wires formed by twisting the third twisted wires;
    winding an insulating fiber thread on a periphery of the assembly of the wires in a second direction opposite to a first direction;
    subsequently forming a cross-section into a rectangular shape,
    a twisting direction of each of the first twisted wires, the second twisted wires, and the third twisted wires is the second direction, and
    a twisting direction of the fourth twisted wire is the first direction.

* * * * *